United States Patent [19]
Rady

[11] 4,277,887
[45] Jul. 14, 1981

[54] CONDUIT CUTTING APPARATUS

[75] Inventor: Robert R. Rady, Strongsville, Ohio

[73] Assignee: Indian Head Inc., New York, N.Y.

[21] Appl. No.: 37,692

[22] Filed: May 10, 1979

[51] Int. Cl.³ .............................................. B26B 13/00
[52] U.S. Cl. ........................................... 30/92; 30/190
[58] Field of Search ................. 30/188, 190, 192, 250, 30/251, 92

[56] References Cited
U.S. PATENT DOCUMENTS

| | | | |
|---|---|---|---|
| 1,820,169 | 8/1931 | Wigand | 30/190 X |
| 3,210,844 | 10/1965 | Tontscheff | 30/192 X |
| 3,243,880 | 4/1966 | Weller | 30/250 |
| 4,055,891 | 11/1977 | Wick | 30/250 |
| 4,176,450 | 12/1979 | Muromoto | 30/92 |

*Primary Examiner*—Jimmy C. Peters
*Attorney, Agent, or Firm*—William R. Laney

[57] ABSTRACT

A device for transversely shearing a conduit including a first handle having a recessed conduit-receiving jaw at one end thereof, a shearing blade pivotally mounted on said first handle at the location for pivoting toward and away from said jaw, and including a plurality of ratchet teeth along one edge thereof, and a second handle pivotally connected to said jaw. An elongated toothed pawl bar having an elongated slot near one end thereof, and having pawl teeth at the other end thereof, is pivotally secured by a pivot pin extending through said slot to said second handle at a point spaced from its point of pivotal connection to said jaw. A cam stud secured to said first handle bears against one side edge of said pawl bar opposite the edge upon which the pawl teeth are located, and functions, when the handles are pivoted toward each other, to cam said pawl bar to a location at which said pawl teeth engage said ratchet teeth.

13 Claims, 6 Drawing Figures

CONDUIT CUTTING APPARATUS

BACKGROUND OF THE INVENTION

1. Field of the Invention

This device relates to manually actuated shearing and cutting devices, and more particularly, to dual handle, leverage-type shears especially adapted for cutting through conduit.

2. Brief Description of the Prior Art

Nakamura U.S. Pat. No. 4,084,317 discloses a shearing tool which is especially adapted for shearing through synthetic resin tubes and conduit. The shearing tool shown in the Nakamura patent includes a pair of handles to one of which a conduit-receiving jaw is fixed. A shearing blade is pivotally mounted on that handle, and is actuated by a pawl and ratchet assembly which interconnects the pivotal shearing blade and a second handle which is connected to the handle which carries the jaw. Springs are required to accomplish the necessary engagement and disengagement of the ratchet teeth carried on an elongated bar pivotally secured to the second handle, and a pawl which is formed at one end of the shearing blade.

Other types of manually actuated cutting or shearing tools include those which are shown in Florian U.S. Pat. No. 3,273,240 and Florian U.S. Pat. No. 3,390,455. Both Florian patents require multi-part mechanisms to accomplish an incremental movement of a shearing blade toward a fixed jaw as the two handles of the shearing tools are stroked toward each other and then opened apart with repeated strokes.

BRIEF DESCRIPTION OF THE PRESENT INVENTION

The present invention provides an improved manually actuated shearing tool which is especially adapted for shearing through synthetic resin conduit and tubing in a transverse direction. The conduit cutting apparatus of this invention is very simple in its construction, having only three moving parts, and does not require the use of any springs or resilient biasing elements to provide operative movement of these parts.

Broadly described, the conduit cutting apparatus of this invention includes a first elongated handle which has a recessed conduit-receiving jaw at one end thereof. Preferably this jaw is formed integrally with the handle. A shearing blade is pivotally mounted on the first handle at a location spaced from the recess in the jaw, and is located for pivoting toward and away from the recess in the jaw during the operation of the conduit cutting apparatus. The shearing blade carries a plurality of ratchet teeth along one edge thereof.

A second handle is pivotally connected to the jaw at a point spaced from the conduit-receiving recess therein, and an elongated, toothed pawl bar has one of its ends connected to the second handle by means of a pin carried by the second handle and extending through an elongated slot formed through the pawl bar near one end thereof. The pawl bar carries a plurality of pawl teeth near the second end (this is the end opposite the elongated slot). A fulcrum pin is secured to the first handle and bears against one side edge of the pawl bar intermediate the ends thereof, and functions to cam the pawl bar to a location at which the pawl teeth carried thereon engage the ratchet teeth at one edge of the shearing blade when the handles of the apparatus are pivoted toward each other.

An important object of the present invention is to provide a conduit cutting tool which is very sturdily constructed mechanically, has relatively few moving parts subject to malfunction, and which develops a very substantial shearing force for cutting incrementally in a series of bites through a conduit in a transverse plane.

An additional object of the present invention is to provide a relatively inexpensive conduit shearing tool which has a long and trouble-free operating life.

A further object of the invention is to provide a conduit cutting tool or apparatus which does not require any springs or resilient biasing elements for operative movement.

Further objects and advantages of the invention will become apparent as the following detailed description of the invention is read in conjunction with the accompanying drawings which illustrate a preferred embodiment of the invention.

GENERAL DESCRIPTION OF THE DRAWINGS

DETAILED DESCRIPTION OF A PREFERRED EMBODIMENT OF THE INVENTION

Figure 1:
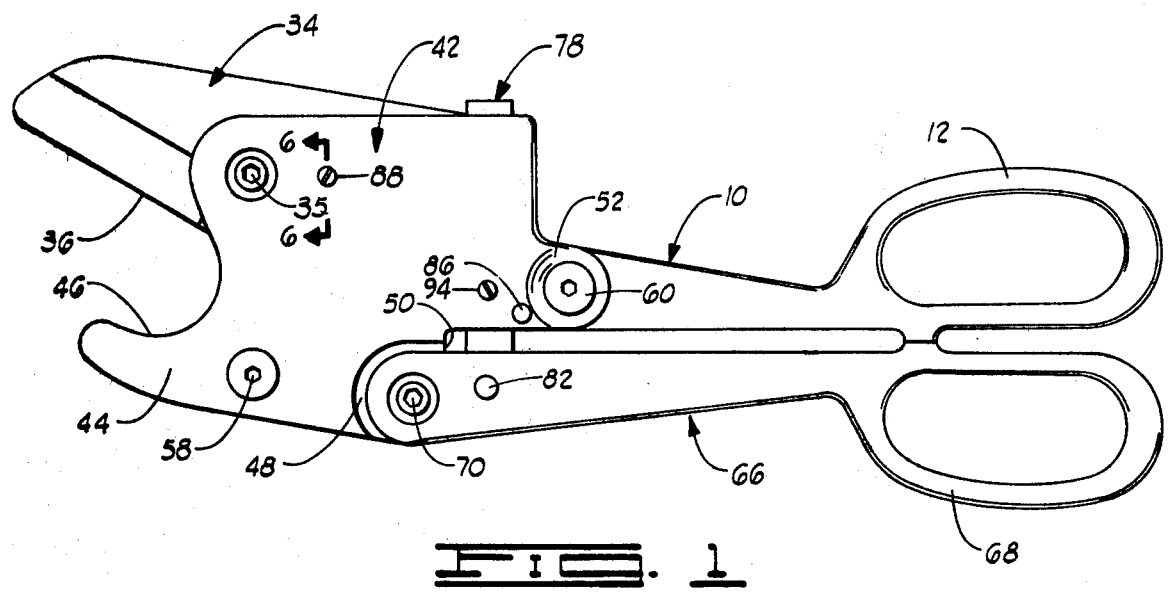
FIG. 1 is a side elevation view of the conduit cutting apparatus constructed in accordance with the invention.
Figure 4:
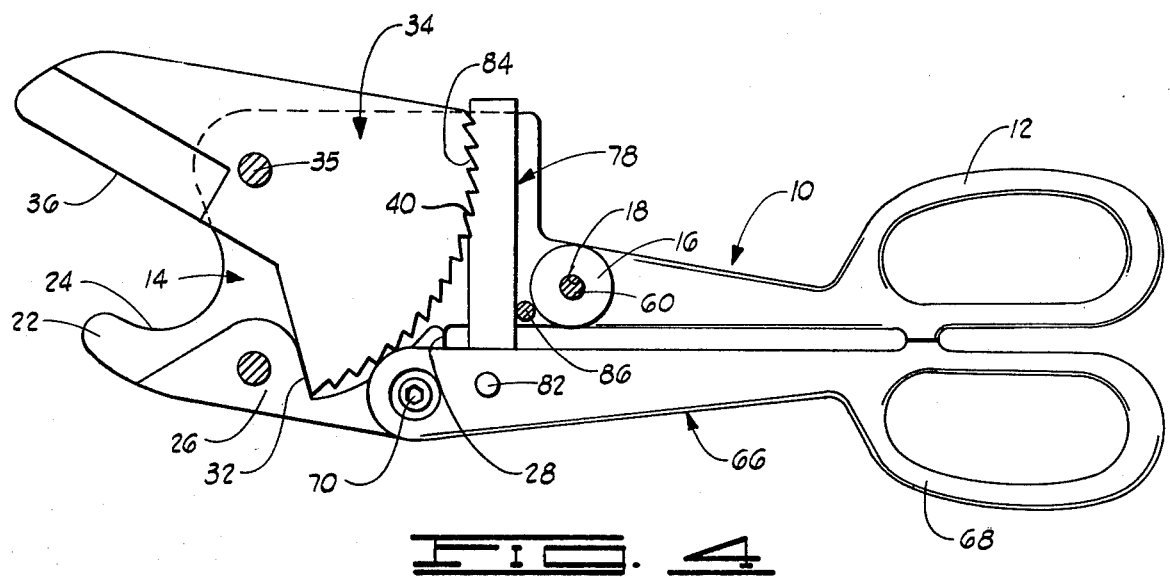
FIG. 4 is a side elevation view similar to FIG. 1 but showing a cover plate removed from one side of the apparatus to reveal the principal operating mechanism of the apparatus.

Referring initially to FIGS. 1 and 4 of the drawings, the conduit cutting apparatus of the invention includes an elongated first handle designated generally by reference numeral 10. The first handle 10 includes a thumb or finger ring 12 disposed at one end thereof. At its end opposite the finger ring 12, the first handle 10 carries a blade mounting plate designated generally by reference numeral 14.

Figure 2:
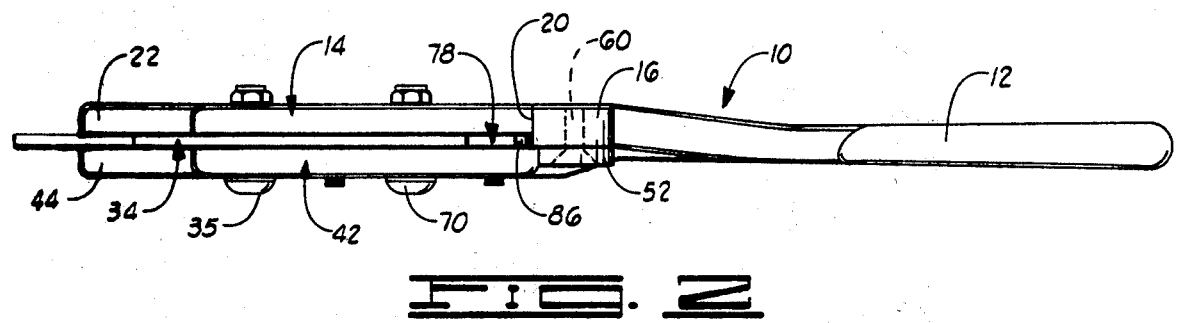
FIG. 2 is a plan view of the conduit cutting apparatus.
Figure 3:
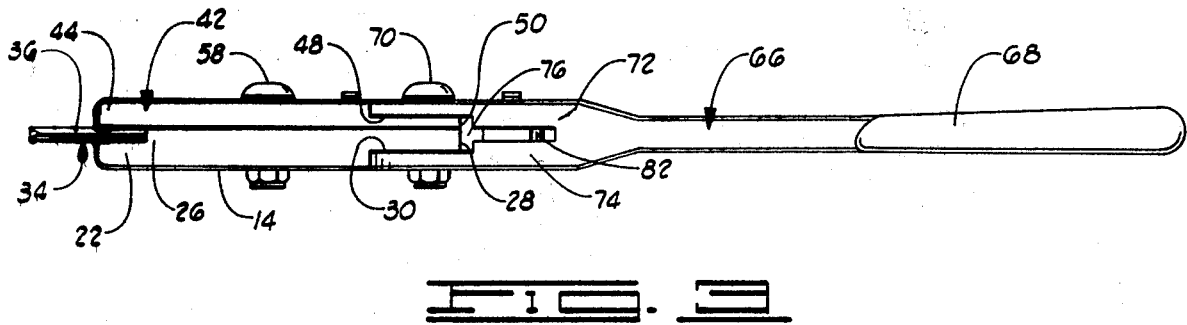
FIG. 3 is a bottom plan view of the conduit cutting apparatus.

As will be noted in referring to FIG. 2, the first handle is angulated intermediate its length. A first portion, which includes the jaw mounting plate, extends along a longitudinal axis which is offset from the longitudinal axis of the second portion which carries the finger ring 12 at one end thereof. At the location of the angulation, a pin block 16 is formed in the first handle and is centrally apertured as shown at 18 to receive a screw or securing pin for a purpose hereinafter described. It is to be noted that the pin block 16 terminates at a front side 20 which projects outwardly from the longitudinal axis of the portion of the first handle forming the blade mounting plate 14.

The lower end portion of the blade mounting plate 14 is formed as a recessed, conduit-receiving jaw 22 which defines a semi-circular recess 24. Adjacent the semi-circular recess 24, a spacer and stop web 26 is preferably cast or formed integrally with the remainder of the first handle 10, and is located on the lower side of the blade mounting plate 14. The web 26 extends rearwardly from the conduit-receiving semi-circular recess 24 and terminates in a transversely extending edge 28. A portion of the web 26 is aligned with a relieved area 30 on the opposite site side of the blade mounting plate 14 from the side thereof which carries the web 26. As will be hereinafter explained, the relieved area 30 is provided for the purpose of accommodating one of a pair of projecting ears of a bifurcated end portion carried on the end of a second handle forming a portion of the conduit cutting apparatus of the invention. Intermediate the length of the spacing and stop web 26, a blade stop abutment 32 is formed.

A conduit shearing blade, designated generally by reference numeral 34, is pivotally secured to the blade mounting plate 14 by a pivot pin 35 for pivotation about an axis which extends normal to the plane of the longitudinal axis of the blade mounting plate, as well as to the plane of the longitudinal axis of that portion of the first handle which carries a finger ring 12. The conduit shearing blade 34 has a straight cutting edge 36 along the lower side thereof and positioned directly over the semi-circular recess 24. On the opposite side of the pivot pin 35 from the straight cutting edge 36, the shearing blade carries, along an arcuate edge thereof, a plurality of ratchet teeth 40. It will be noted that the ratchet teeth 40 are pitched so that the opening to the troughs between teeth faces downwardly toward the spacer and stop web 26, rather than upwardly in the opposite direction.

A cover plate, designated generally by reference numeral 42, includes a forward portion which is complementary in configuration to the blade mounting plate 14 carried at the forward end of the first handle 10, and thus includes a conduit-receiving jaw 44 having a semi-circular recess 46 formed therein. A relieved area 48 which corresponds in configuration to the relieved area 30 formed on the outer side of the first handle 10 is provided, and a transverse edge 50 is formed on the cover plate 42 at a location which is aligned with the transverse edge 28 when the cover plate is secured to the first handle in a manner hereinafter described. At its side opposite the semi-circular recess 46, the cover plate 42 includes an attachment boss 52 which projects from the main body of the plate and defines a central bore or aperture (not visible) for receiving a securing screw or bolt hereinafter described.

The cover plate 42 is secured to the first handle 10 by means of securing screws or bolts 58 and 60. The securing bolt 58 is passed through aligned apertures in the cover plate 42, spacing and stop web 26 and the blade mounting plate 14 of the first handle 10. The securing bolt 60 is passed through the central aperture or bore in the attachment boss 52 and the aligned aperture 18 in the pin block 16 of the first handle 10. It will be perceived that because of a longitudinal offset of the pin block 16, and the spacing provided by the spacing and stop web 26, the cover plate 42, at its upper portion, is spaced from the blade mounting plate 14 of the first handle 10. This space thus accommodates the blade 34 which is pivotally mounted in this space by the use of the pivot pin 35 which is extended through registering pin apertures in the cover plate, and in the blade mounting plate 14 of the first handle 10.

A second elongated handle forms a part of the conduit cutting apparatus of the invention and is designated generally by reference numeral 66. The second elongated handle 66 includes a finger ring 68 located at one end thereof, and defines an aperture for receiving a pivot pin 70 near the opposite end thereof. The second end at which the pivot pin 70 is located is bifurcated, and includes a pair of ear portions 72 and 74. The ear portions 72 and 74 respectively project to the outside of the cover plate 42 and the blade mounting plate 14 of the first handle 10, with the two ears being received in the relieved areas 30 and 48, respectively, of these elements.

It will be noted that the slot 76 between the ear portions 72 and 74 which constitutes the bifurcation at one end of the second elongated handle 66 is of substantially larger width at the location where the pivot pin 70 projects through this end of the handle portion than it is relatively further along the handle portion toward the finger ring 68. This narrower portion of the slot 76 forming the bifurcation is adapted to slidingly receive one end portion of an elongated pawl bar designated generally by reference numeral 78. In the illustrated embodiment the pawl bar is of substantially rectangular configuration and includes a pair of elongated side edges. At the end portion of the elongated pawl bar 78 which projects through the narrow portion of the slot 76, the pawl bar defines an elongated slot 80 which extends at an angle of about 30° to the longitudinal axis of the pawl bar. At this location, a lever stud, which with the slot 76 constitutes a lever means 82 is carried on the second elongated handle 66 and projects across the narrow portion of the bifurcation in registry with, and through, the elongated slot 80, and does so during operation of the conduit cutting apparatus in a manner hereinafter described.

At its end opposite that end in which the elongated slot 80 is located, the elongated pawl bar 78, which can be substantially rectangular in configuration as shown, carries a series of pawl teeth 84 along one longitudinal edge thereof. The pawl teeth 84 are dimensioned and configured to mate with and engage the ratchet teeth 40 carried on the arcuate edge of the conduit shearing blade 34. The elongated pawl bar 78 projects upwardly and bears at its longitudinal edge opposite that which carries the pawl teeth 84 against a fulcrum pin 86. The fulcrum pin 86 is secured between the first handle 10 and the cover plate 42. The fulcrum pin 86 is positioned so as to cooperate with the lever stud 82 in causing the leveraged pivotal movement of the elongated pawl bar 78 as the handles 10 and 66 are pivoted toward and away from each other in a manner hereinafter described.

Figure 6:
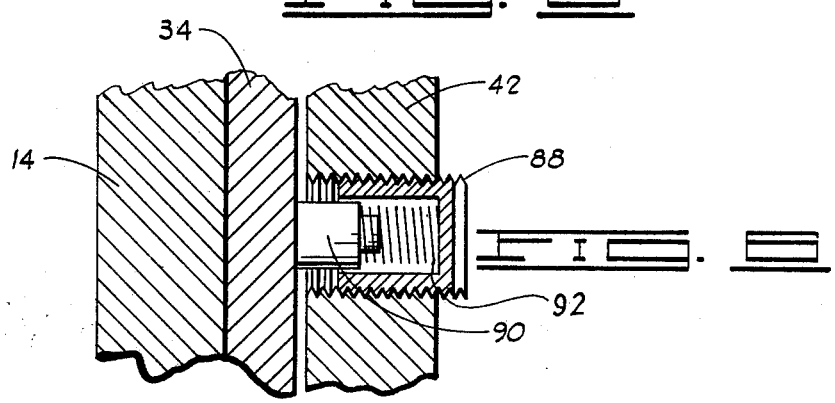
FIG. 6 is a cross-sectional view of a portion of the cutting apparatus shown in FIG. 1.

To provide the proper feel and steady movement of shearing blade 34 and pawl bar 78, a frictional contact is applied to slightly retard their movement. Referring to FIG. 1, a set screw 88 extends into cover plate 42 to align and adjust a plunger bearing on the side of shearing blade 34. FIG. 6 shows a cross-sectional view of set screw 88 and the plunger 90 it aligns. A spring 92, loaded inside set screw 88, urges plunger 90 toward the shearing blade 34 which is, in turn, urged toward the blade mounting plate 14. Turning the set screw 88 varies the pressure on plunger 90. The frictional contact provided by plunger 90 allows a smooth advancement of the shearing blade which, otherwise, might undesirably lose its position due to slight jars or gravity. In this manner, operation of the cutting apparatus is not dependent on the tilt of the cutter. A set screw 94 similarly holds a plunger which is urged against pawl bar 78 to provide smooth operation of the pawl bar movement. Of course, these spring-loaded frictional contacts are not at all operationally similar to the springs or biasing means of prior art cutters. In fact, instead of operationally moving the cutting blade or its associated parts, they selectively retard such movement.

OPERATION

Figure 5:
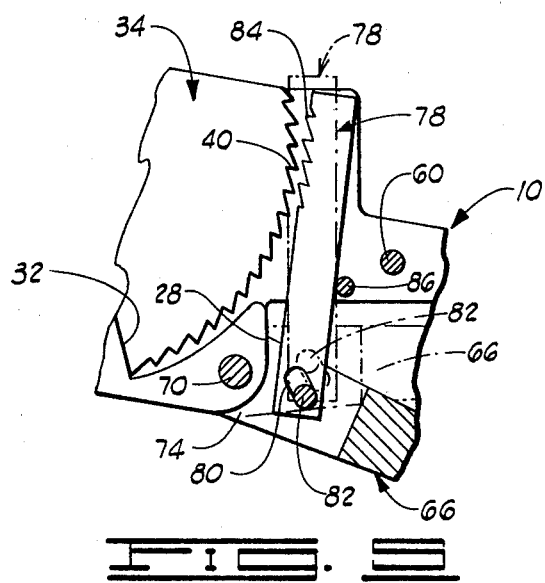
FIG. 5 is a detail view illustrating the operating apparatus of the mechanism in a different operating position from that in which it is depicted in FIG. 4.

In the operation of the conduit cutting apparatus of the invention, the handles 10 and 66 are first opened apart from each other in the manner illustrated in FIG. 5. This action causes the lever stud 82 to move down to the bottom of the slot 80, and in doing so to move across the longitudinal axis of the pawl bar 78. This movement causes the pawl bar 78 to pivot so that its end connected to the handle 66 moves to the left as viewed in FIG. 5, and the end of the pawl bar which carries the teeth 84 moves to the right as shown in FIG. 5. This disengages the pawl teeth 84 from the ratchet teeth 40 and allows the shearing blade 34 to be free to pivot. This movement of the pawl bar 78 may be referred to as negative movement of the pawl bar.

If shearing blade 34 is not already in a retracted or open position, the blade can now be manually moved to that position. FIG. 1 shows the blade in an open position. After this manual adjustment, plunger 90 holds the blade in the open position.

A length of conduit to be sheared through is then placed in the semi-circular recess 24 in the blade mounting plate 14. The handles 10 and 66 are then moved toward each other. This movement causes the lever stud 82 to move upwardly to the top end of the slot 80, and in doing so to move across the longitudinal axis of the pawl bar 78. This movement is a positive movement of the pawl bar, which means that the pawl bar moves in a direction which can urge a cutting action. As the lever stud 80 moves across the longitudinal axis of the pawl bar 78, the upper end of the pawl bar swings toward the left as viewed in FIG. 5, and the pawl teeth 84 move into engagement with the ratchet teeth 40. The lower end of the pawl bar 78 swings to the right as the pawl bar pivots about the fulcrum pin 86. The friction provided by plunger 90 and set screw 94 allow a smooth movement of the pawl bar in the manner described. Continued upward movement of the second handle 66 toward the first handle 10 causes an upward movement of the pawl bar 78 after the teeth 84 thereof are engaged with the teeth 40 on the shearing blade 34. This upward movement causes an incremental movement of the shearing blade and pivotation about the pin 35 so that the blade edge 36 is moved nearer to the conduit.

These actions are repeated with incremental or stepping movement of the shearing blade until the edge 36 is driven into the conduit and shears through it in a transverse direction.

After the conduit has been sheared through, plunger 90 causes the shearing blade 34 to remain in its cutting position until manually moved to an open position, once disengagement of the pawl teeth 84 from the ratchet teeth 40 has been effected by moving the handles apart from each other. Once opened, the conduit cutting apparatus is then in position for shearing through another piece of conduit.

Although a preferred embodiment of the invention has been herein described in order to provide an example of one physical embodiment of the general principles of the invention, certain changes and innovations can be made in the illustrated and described structure without departing from such general principles. Changes and innovations of this type are therefore deemed to be circumscribed by the spirit and scope of the invention, except as the same may be necessarily limited by the appended claims or reasonable equivalents thereof.

What is claimed is:

1. A conduit cutting apparatus comprising:
    a first handle;
    a conduit-receiving jaw at one end of said first handle;
    a shearing blade pivotally mounted on said first handle at a location for pivoting toward and away from said conduit-receiving jaw, said blade having a plurality of ratchet teeth along one edge thereof;
    a second handle pivotally connected to said jaw;
    an elongated toothed pawl bar having pawl teeth adjacent one end thereof and having a second end pivotally connected to said second handle, said pawl bar having a slot formed therein at a location adjacent said second end, said slot being angled with respect to the longitudinal axis of said pawl bar;
    a fulcrum pin secured to said first handle and bearing guidingly against said pawl bar; and
    lever means cooperating with said pawl bar and said second handle for pivoting said toothed pawl bar on said fulcrum pin to engage and disengage sand pawl teeth and said ratchet teeth when said handles are pivoted toward and away from each other, said lever means including a lever stud secured to said second arm and extending through said slot in said elongated toothed pawl bar.

2. Conduit cutting apparatus comprising:
    a first handle;
    a conduit-receiving jaw at one end thereof;
    a shearing blade pivotally mounted on said first handle at a location for pivoting toward and away from said conduit-receiving jaw, said blade having a plurality of ratchet teeth along one edge thereof;
    a second handle pivotally connected to said jaw;
    an elongated toothed pawl bar having pawl teeth adjacent one end thereof and having a second end pivotally connected to said second handle;
    a fulcrum pin secured to said first handle and bearing guidingly against said pawl bar;
    lever means cooperating with said pawl bar and second handle for pivoting said toothed pawl bar on said fulcrum pin to engage and disengage said pawl teeth and said ratchet teeth when said handles are pivoted toward and away from each other; and
    a spacer and stop web carried on said first handle adjacent said conduit-receiving jaw and adjacent said blade.

3. Conduit cutting apparatus as defined in claim 2 and further characterized as including a cover plate secured to said spacer and stop web and spaced from said shearing blade on the opposite side thereof from said first handle, said cover plate including
    a portion complementary in configuration to said conduit-receiving jaw; and
    an attachment boss secured to said first handle and defining with said first handle and said spacer and stop web, a space accommodating said toothed pawl bar.

4. Conduit cutting apparatus as defined in claim 3 wherein said cover plate is relieved over a portion of its side opposite the side secured to said spacer and stop web, and wherein said first handle is relieved over an area aligned with the relieved portion of said cover plate, and wherein said second handle has a bifurcated end portion including ears projecting into the relief in said portion of said cover plate and into the relieved area of said first handle.

5. An apparatus for cutting conduit or the like comprising:
   a jaw member for receiving a conduit;
   a shearing blade pivotally mounted on the jaw member for cutting a conduit positioned in the jaw member, the blade having a plurality of ratchet teeth disposed along one edge of the blade;
   a pawl member having pawl teeth disposed for engaging the ratchet teeth, and further having a slot formed therein;
   a fulcrum pin disposed in fixed relation to the jaw member for guiding the motion of the pawl member; and
   motive means for moving the pawl member with respect to the jaw member, the pawl member being pivotally attached to the motive means such that the fulcrum pin guides the pawl member to engage the pawl teeth and the ratchet teeth during positive movement of the pawl member with respect to the jaw member, and such that the fulcrum pin guides the pawl member to disengage the pawl teeth and the ratchet teeth during negative movement of the pawl member with respect to the jaw member, and such that the fulcrum pin guides the pawl member to disengage the pawl teeth and the ratchet teeth during negative movement of the pawl member with respect to the jaw member, said motive means comprising a pin slidably secured in said slot and said slot being angled for urging the engagement and disengagement of the pawl teeth and the ratchet teeth.

6. The apparatus of claim 5 wherein the pawl member comprises a bar having the pawl teeth disposed at one end of the bar and the slot disposed at the other end of the bar.

7. The apparatus of claim 6 wherein the pawl teeth are disposed on one side of the bar and wherein the cam stud bears against the other side of the bar, and wherein the ratchet teeth are disposed on an arcuate-shaped edge of the shearing blade.

8. The apparatus of claim 7 wherein the slot is angled approximately 30° to the longitudinal axis of the bar.

9. An apparatus for cutting conduit or the like comprising:
   a jaw member for receiving conduit;
   a cutting member pivotally connected to the jaw member and having a shearing blade formed on one edge thereof for cutting a conduit positioned in the jaw member, the cutting member having a plurality of ratchet teeth formed in an arcuate edge of the cutting member opposite the shearing blade;
   a pawl member disposed for engaging the ratchet teeth;
   motive means for moving the pawl member with respect to the jaw member;
   means, responsive to said motive means, for urging the pawl member into engagement with the ratchet teeth during positive movement of the pawl member with respect to the jaw member and for urging the pawl member into disengagement with the ratchet teeth during negative movement of the pawl member; and
   said means for urging the pawl member comprising a fulcrum pin and a lever stud, and said pawl member having a slot for receiving the lever stud in sliding engagement, said slot being angled with respect to the axis of positive and negative movement of the pawl member with respect to the jaw member.

10. The apparatus of claim 9 wherein the motive means comprises a pair of pivotally connected handles, the first of the handles being fixedly connected to the jaw member, the pawl member being pivotally connected to the second of the handles.

11. The apparatus of claim 10 wherein the said fulcrum pin is connected to the first of the handles and disposed for bearing against the pawl member for guiding the motion of the pawl member and wherein the lever stud is connected to the second of the handles.

12. An apparatus for cutting conduit or the like comprising:
   a first handle having a jaw for receiving conduit formed in one end thereof;
   a cutting member pivotally connected to the first handle having a shearing blade formed on one end thereof for cutting a conduit positioned in the jaw, the cutting member having a plurality of ratchet teeth formed in an arcute edge of the cutting member opposite the shearing blade;
   a pawl member having pawl teeth disposed for engaging said ratchet teeth;
   a second handle pivotally connected to the first handle and pivotally connected to the pawl member; and
   means responsive to the pivoting movement of the first handle with respect to the second handle for urging the pawl teeth into engagement with the ratchet teeth as the first handle pivots toward the second handle, and for urging the pawl teeth into disengagement with the ratchet teeth as the first handle pivots away from the second handle, said means for urging the pawl teeth into engagement comprising a pin, and wherein the pawl member has a slot therein receiving said pin in sliding engagement, said slot being angled to the axis of movement of said pawl member.

13. The apparatus of claim 12 wherein the cam means further comprises a fulcrum pin connected to the first handle and bearing against the pawl member for guiding the motion of the pawl member and wherein the pin is connected to the second handle.

* * * * *